(12) United States Patent
Gao

(10) Patent No.: US 12,425,627 B2
(45) Date of Patent: Sep. 23, 2025

(54) METHODS AND APPARATUSES FOR PROCESSING BITSTREAM, TERMINAL DEVICE, AND STORAGE MEDIUM

(71) Applicant: ZTE CORPORATION, Shenzhen (CN)

(72) Inventor: Ying Gao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 77 days.

(21) Appl. No.: 18/555,912

(22) PCT Filed: Mar. 18, 2022

(86) PCT No.: PCT/CN2022/081593
§ 371 (c)(1),
(2) Date: Oct. 18, 2023

(87) PCT Pub. No.: WO2022/222656
PCT Pub. Date: Oct. 27, 2022

(65) Prior Publication Data
US 2024/0223794 A1  Jul. 4, 2024

(30) Foreign Application Priority Data

Apr. 20, 2021 (CN) .......................... 202110426571.1

(51) Int. Cl.
*H04N 19/46* (2014.01)
*H04N 19/44* (2014.01)
*H04N 19/70* (2014.01)

(52) U.S. Cl.
CPC ............. *H04N 19/46* (2014.11); *H04N 19/44* (2014.11); *H04N 19/70* (2014.11)

(58) Field of Classification Search
CPC ........ H04N 19/46; H04N 19/30; H04N 19/70; H04N 19/44
(Continued)

(56) References Cited

U.S. PATENT DOCUMENTS

| 10,575,035 B2 | 2/2020 | Bright-Thomas |
| 2015/0271513 A1* | 9/2015 | Hendry ................ H04N 19/187 375/240.26 |

(Continued)

FOREIGN PATENT DOCUMENTS

| CN | 110419223 A | 11/2019 |
| WO | WO2021049580 A1 | 3/2021 |
| WO | WO2021061392 A1 | 4/2021 |

OTHER PUBLICATIONS

International Search Report in Application No. PCT/CN2022/081593, dated Jun. 10, 2022, 4 pages, including translation.

(Continued)

*Primary Examiner* — Marnie A Matt
(74) *Attorney, Agent, or Firm* — Morgan, Lewis & Bockius LLP

(57) ABSTRACT

Provided are methods and apparatuses for processing a bitstream, a terminal device and a storage medium The method for processing a bitstream includes acquiring an encoded bitstream, where the encoded bitstream includes encoding indication information, where the encoding indication information is used for indicating a bitstream type of the encoded bitstream; acquiring the encoding indication information; and decoding the encoded bitstream according to the encoding indication information.

18 Claims, 4 Drawing Sheets

(58) Field of Classification Search
USPC .................................................. 375/240.26
See application file for complete search history.

(56) References Cited

U.S. PATENT DOCUMENTS

| | | |
|---|---|---|
| 2016/0212439 A1 | 7/2016 | Hannuksela |
| 2018/0278964 A1* | 9/2018 | Wang ................. H04N 21/6332 |
| 2022/0217393 A1* | 7/2022 | Wang ..................... H04N 19/70 |
| 2022/0272364 A1* | 8/2022 | Drugeon .............. H04N 19/157 |

OTHER PUBLICATIONS

Extended European Search Report in Application No. 22790765.6, dated Mar. 10, 2025, 10 pages, including translation.

Kang et al., "MV-HEVC/SHVC HLS: On Layers Not Present SEI message", Joint Collaborative Team on Video Coding-(JCT-VC) of ITU-T SG 16 WP 3 and ISO/IEC JTC 1/SC 29/WG 11, 15th Meeting: Geneva, CH, Oct. 23-Nov. 1, 2013, Joint Collaborative Team on 3D Video Coding Extensions of ITU-T SG 16 WP 3 and ISO/IEC JTC 1/SC 29/WG 11, 6th Meeting: Geneva, CH, Oct. 25-Nov. 1, 2013.

\* cited by examiner

METHODS AND APPARATUSES FOR PROCESSING BITSTREAM, TERMINAL DEVICE, AND STORAGE MEDIUM

CROSS REFERENCE TO RELATED APPLICATIONS

This is a National Stage Application, filed under 35 U.S.C. 371, of International Patent Application No. PCT/CN2022/081593, filed on Mar. 18, 2022, which is based on and claims priority to Chinese Patent Application No. 202110426571.1 filed with the China National Intellectual Property Administration (CNIPA) on Apr. 20, 2021, the disclosure of which is incorporated herein by reference in its entirety.

TECHNICAL FIELD

The present application relates to the technical field of communications, for example, methods and apparatuses for processing a bitstream, a terminal device and a storage medium.

BACKGROUND

With the rapid development of digital media technologies, various surveillance cameras are deployed more and more intensively. Most surveillance cameras used in the market have a basic intelligent analysis function and can intelligently analyze the picture content while capturing a surveillance video picture, determining whether the current picture has an abnormal event or another set event that requires attention. The picture that has been determined to have an abnormal event or another set event that requires attention may be considered as a key picture. How to reduce the decoding overhead is a technical problem that needs to be solved urgently.

SUMMARY

The present application provides methods and apparatuses for processing a bitstream, a terminal device and a storage medium to reduce the decoding overhead.

The present application provides a method for processing a bitstream. The method includes the following.

An encoded bitstream is acquired, where the encoded bitstream includes encoding indication information, where the encoding indication information is used for indicating a bitstream type of the encoded bitstream. The encoding indication information is acquired. The encoded bitstream is decoded according to the encoding indication information.

The present application provides a method for processing a bitstream. The method includes the following.

An image encoding bitstream and encoding indication information corresponding to the image encoding bitstream are generated. The encoding indication information is added to the image encoding bitstream to obtain an encoded bitstream. The encoded bitstream is sent.

The present application provides an apparatus for processing a bitstream. The apparatus includes a first acquisition module, a second acquisition module and a decoding module.

The first acquisition module is configured to acquire an encoded bitstream, where the encoded bitstream includes encoding indication information, where the encoding indication information is used for indicating a bitstream type of the encoded bitstream. The second acquisition module is configured to acquire the encoding indication information. The decoding module is configured to decode the encoded bitstream according to the encoding indication information.

The present application provides an apparatus for processing a bitstream. The apparatus includes a generation module, an addition module and a sending module.

The generation module is configured to generate an image encoding bitstream and encoding indication information corresponding to the image encoding bitstream. The addition module is configured to add the encoding indication information to the image encoding bitstream to obtain an encoded bitstream. The sending module is configured to send the encoded bitstream.

The present application provides a terminal device. The terminal device includes one or more processors, and a storage apparatus configured to store one or more programs. When executed by the one or more processors, the one or more programs cause the one or more processors to perform any method for processing a bitstream according to embodiments of the present application.

The present application provides a storage medium storing a computer program which, when executed by a processor, causes the processor to perform any method for processing a bitstream according to embodiments of the present application.

DETAILED DESCRIPTION

Embodiments of the present application are described hereinafter in conjunction with drawings.

The steps illustrated in the flowcharts among the drawings may be performed by, for example, a computer system capable of executing a set of computer-executable instructions. Moreover, although logical sequences are illustrated in the flowcharts, in some cases, the illustrated or described steps may be performed in sequences different from those described herein.

Figure 1:
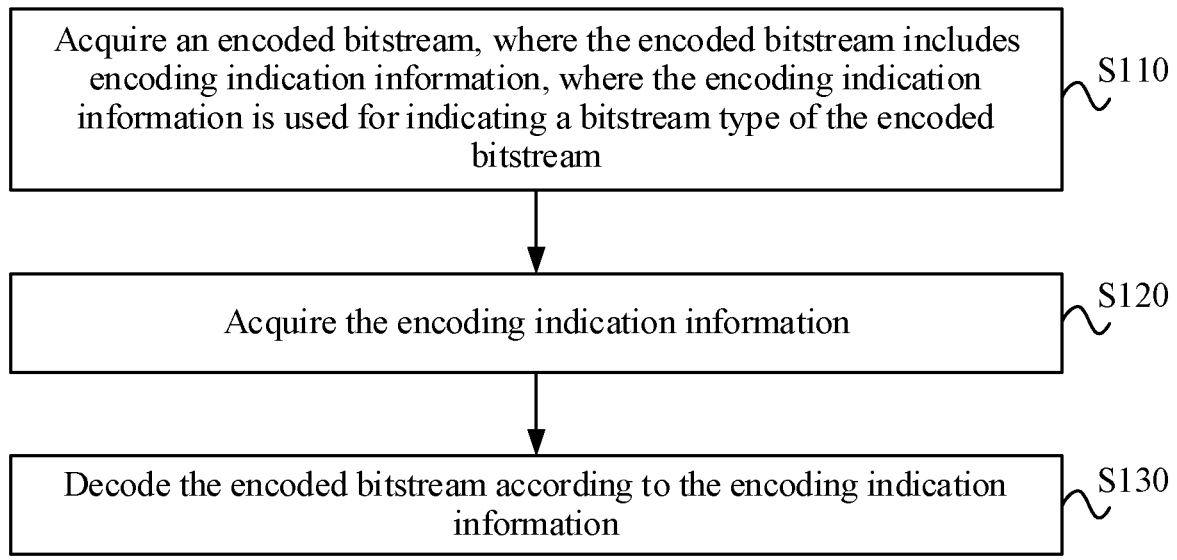
FIG. 1 is a flowchart of a method for processing a bitstream according to an embodiment of the present application.

In an exemplary embodiment, FIG. 1 is a flowchart of a method for processing a bitstream according to an embodiment of the present application. The method is applicable to the case of reducing the decoding overhead. The method may be executed by an apparatus for processing a bitstream, may be implemented by software and/or hardware and may be integrated in a terminal device.

With the rapid development of digital media technologies, various surveillance cameras are deployed more and more intensively in urban security, causing an explosive growth in surveillance video services. Meanwhile, due to the improvement of video capture capabilities, image resolution is constantly increased, and video data that requires to be transmitted increases. This not only brings a heavy burden to a network, but also brings a great challenge to the storage capacity of a client.

Most surveillance cameras used in the market have a basic intelligent analysis function and can intelligently analyze the picture content while capturing a surveillance video picture, determining whether the current picture has an abnormal event or another set event that requires attention. Such a picture is always a key picture that requires to be focused on in a surveillance video. Therefore, how to improve the quality of the key picture as much as possible and how to ensure that the video can satisfy a required storage duration while details of the key picture are reserved in the case where a bandwidth and the storage capacity remain unchanged is a problem that requires to be solved in the solutions of the present application.

For a common video, the related technology may make video contents having different resolution levels and identify a video resource of each resolution level. Before acquiring a video resource, a user requests resolution description information of a video resource of each resolution level. According to different network bandwidth conditions and terminal presentation capabilities, a video resource of a proper resolution level is selected, and a corresponding video resource is selectively received or actively acquired. However, for a surveillance video, video content plays a significant role not only in real-time surveillance but also in searching for clues afterwards, so network bandwidth consumption and the storage duration should be considered. Adoption of a relatively high resolution results in a relatively large network bandwidth consumption, and a shorter preservable time of the video content and reduced video traceability in the case where the user-side storage space remains unchanged. Although adoption of a relatively low resolution may reduce the network bandwidth consumption and the user-side storage space overhead, some detailed information in the key picture may be lost, resulting in loss of significant clues.

With the wide application of 360-degree panoramic video and ultrahigh-resolution video services, a brand-new video content type distinguished from the common video, such as a non-uniform panoramic video content type containing a main view field in a panoramic video or an ultrahigh-resolution video content type composed of different quality block videos in an ultrahigh-resolution video, may use a relatively high resolution for a main view field picture viewed by a user only while using a relatively low resolution for other viewing angle pictures so as to reduce the network overhead. However, the preceding solution not only requires a relatively high capability of a encoding end, but also is relatively expensive. For a large number of video surveillance scenarios, the encoding capability of an encoder is not enough to code different quality blocks in the same picture. The High Efficiency Video Coding (H.265/HEVC) standard and Versatile Video Coding (H.266/VVC) standard developed by the Joint Video Experts Team (JVET) under the International Organization for Standardization/International Electrotechnical Commission (ISO/IEC) and International Telecommunication Union (ITU) have supported the concept of "multilayer video encoding/Scalable Video Encoding".

A video bitstream may include a base layer sub-bitstream and at least one enhancement layer sub-bitstream. The at least one enhancement layer sub-bitstream may be an independent enhancement layer sub-bitstream or a dependent enhancement layer sub-bitstream. The base layer sub-bitstream may be independently decoded to provide video content of basic quality. The independent enhancement layer sub-bitstream may be independently decoded to provide video content of relatively high quality. The dependent enhancement layer sub-bitstream requires to be decoded with the base layer sub-bitstream to provide video content of relatively high quality. The preceding multilayer video encoding idea is applied to a video surveillance scenario. A conventional video surveillance picture is encoded into the base layer sub-bitstream to provide the video content of basic quality. When the key picture (such as abnormal occurrence, personnel intrusion, or a specific event) is detected, the enhancement layer sub-bitstream is used for providing the video content of relatively high quality so as to provide more event details. However, in the related art, after deeply decoding a received multilayer encoding bitstream (at least parsing a video parameter set (VPS) in the bitstream), a decoding end can parse the necessary information and extract a related layer bitstream required by the user side, wasting the unnecessary decoding overhead.

To solve the preceding technical problem, as shown in FIG. 1, the method for processing a bitstream according to the present application includes the following.

In S110, an encoded bitstream is acquired, where the encoded bitstream includes encoding indication information, where the encoding indication information is used for indicating a bitstream type of the encoded bitstream.

The bitstream type may indicate the type to which the encoded bitstream belongs. In this embodiment, the encoded bitstream includes the encoding indication information to indicate decoding, thereby reducing the decoding overhead. The bitstream type is not limited here.

In an embodiment, encoded bitstreams may include a multilayer encoding bitstream and a termination bitstream. Types corresponding to the multilayer encoding bitstream and the termination bitstream may be indicated by the bitstream type. The termination bitstream may be considered as a bitstream that terminates the persistent scope indicated by the previous encoding indication information. The termination bitstream may be a multilayer encoding bitstream or a non-multilayer encoding bitstream.

In this embodiment, the bitstream type may be indicated by at least one of the following in the encoding indication information: cancellation identifier indication information, the encoding indication information itself, or keyframe identifier information.

That the termination bitstream is a multilayer encoding bitstream or a non-multilayer encoding bitstream may be indicated by at least one of: the cancellation identifier indication information, the encoding indication information itself, or the keyframe identifier information.

In this embodiment, the terminal device may be considered as a decoding end device. In this step, an encoded bitstream of the encoding end may be acquired. An encoded bitstream obtained by encoding by a local end may be also acquired.

The encoding indication information is not limited in this embodiment. For example, a supplemental enhancement information (SEI) message or the encoding indication information is indicated in the file encapsulation of the bitstream.

In S120, the encoding indication information is acquired.

After the encoded bitstream is acquired, the encoded bitstream may be parsed to acquire the encoding indication information included in the encoded bitstream in this step.

How to acquire the encoding indication information is not limited here and may be determined based on the position of the encoding indication information in the encoded bitstream.

In S130, the encoded bitstream is decoded according to the encoding indication information.

In the case where the encoded bitstream is decoded, decoding is performed based on the encoding indication information in this embodiment. Since the encoding indication information is used for indicating the bitstream type of the encoded bitstream, when decoding is performed, the decoding can be performed in conjunction with the bitstream type, reducing the decoding overhead. How to decode is not limited here.

In the case where the encoded bitstream is a multilayer encoding bitstream, or in the case where the encoded bitstream is a termination bitstream that is a multilayer encoding bitstream, the encoded bitstream may be decoded in conjunction with information indicating decoding in the encoding indication information. The information indicating decoding includes, but is not limited to, one of: an enhancement type parameter, sub-bitstream parameter information, keyframe identifier information, or persistence identifier information.

In the method for processing a bitstream according to the present application, the encoded bitstream is acquired, where the encoded bitstream includes the encoding indication information, where the encoding indication information is used for indicating the bitstream type of the encoded bitstream; the encoding indication information is acquired; and the encoded bitstream is decoded according to the encoding indication information. The method can effectively reduce the decoding overhead.

Based on the preceding embodiments, variant embodiments of the preceding embodiments are provided. For the brevity of description, only differences from the preceding embodiments are described in the variant embodiments.

In an embodiment, the encoding indication information includes a supplemental enhancement information (SEI) message, and bitstreams corresponding to the bitstream type include a multilayer encoding bitstream and a termination bitstream, where the termination bitstream is a bitstream whose termination encoding is a multilayer encoding bitstream.

In this embodiment. SEI messages may include an SEI message in the standards and a newly added SEI message.

In an embodiment, the SEI message includes at least one of: an extended user data SEI message, an extended user data unregistered SEI message, or a newly added SEI message.

In an embodiment, the SEI message includes at least one of: an enhancement type parameter, sub-bitstream parameter information, keyframe identifier information, cancellation identifier indication information, or persistence identifier information. The enhancement type parameter is configured for indicating an enhancement type of an enhancement layer sub-bitstream included in the encoded bitstream, the sub-bitstream parameter information is used for determining a sub-bitstream that requires to be extracted from the encoded bitstream, the keyframe identifier information is configured for indicating whether the encoded bitstream is a multilayer encoding bitstream, the cancellation identifier indication information is configured for indicating whether a persistence limit of the previous SEI message is canceled by a corresponding SEI message, and the persistence identifier information is configured for indicating whether a persistence limit is set.

Subcode streams in the present application refer to a base layer sub-bitstream and an enhancement layer sub-bitstream. The enhancement type parameter and enhancement layer type parameter are unified as the enhancement type parameter that is a parameter carried in the SEI message.

In the present application, a sub-bitstream type and an enhancement layer sub-bitstream type may be unified as the enhancement layer sub-bitstream type, that is, the type corresponding to the independent enhancement layer sub-bitstream and dependent enhancement layer sub-bitstream.

The previous SEI message may be considered as a previous SEI message sent by a encoding end corresponding to the current encoded bitstream and is included in the corresponding encoded bitstream.

Canceling the persistence limit of the previous SEI message may be considered as canceling the encoding to a multilayer encoding bitstream starting from the bitstream corresponding to the cancellation identifier indication information or canceling the encoding to a multilayer encoding bitstream after the bitstream corresponding to the cancellation identifier indication information.

In the case where the persistence limit is set for the persistence identifier information, after the corresponding encoded bitstream, encoding bitstreams having a set number may each be limited to be a multilayer encoding bitstream. The set number may be used for determining the persistent scope of the persistence.

In an embodiment, the sub-bitstream parameter information includes at least one of: an enhancement layer number parameter, a quality level, or a layer identifier of a sub-bitstream corresponding to the quality level, where the number of sub-bitstreams corresponding to the quality level is greater than or equal to one, the enhancement layer number parameter is configured for indicating the number of enhancement layer sub-bitstreams included in the encoded bitstream, and the quality level is configured for indicating a quality level that may be provided by the sub-bitstream in the encoded bitstream.

In an embodiment, that the encoded bitstream is decoded according to the encoding indication information includes the following.

A sub-bitstream is acquired from the encoded bitstream according to the encoding indication information. The sub-bitstream is decoded.

In this embodiment, a layer identifier of a sub-bitstream that requires to be extracted from the encoded bitstream may be determined based on the encoding indication information. How to determine is not limited here, for example, to determine based on the quality level.

In an embodiment, that the sub-bitstream is acquired from the encoded bitstream according to the encoding indication information includes the following.

An enhancement type parameter included in the encoding indication information is acquired. sub-bitstream parameter information corresponding to the enhancement type parameter is acquired. A layer identifier of a sub-bitstream that requires to be extracted is determined according to the sub-bitstream parameter information and a required quality level. The sub-bitstream is extracted from the encoded bitstream according to the layer identifier of the sub-bitstream.

Figure 2:
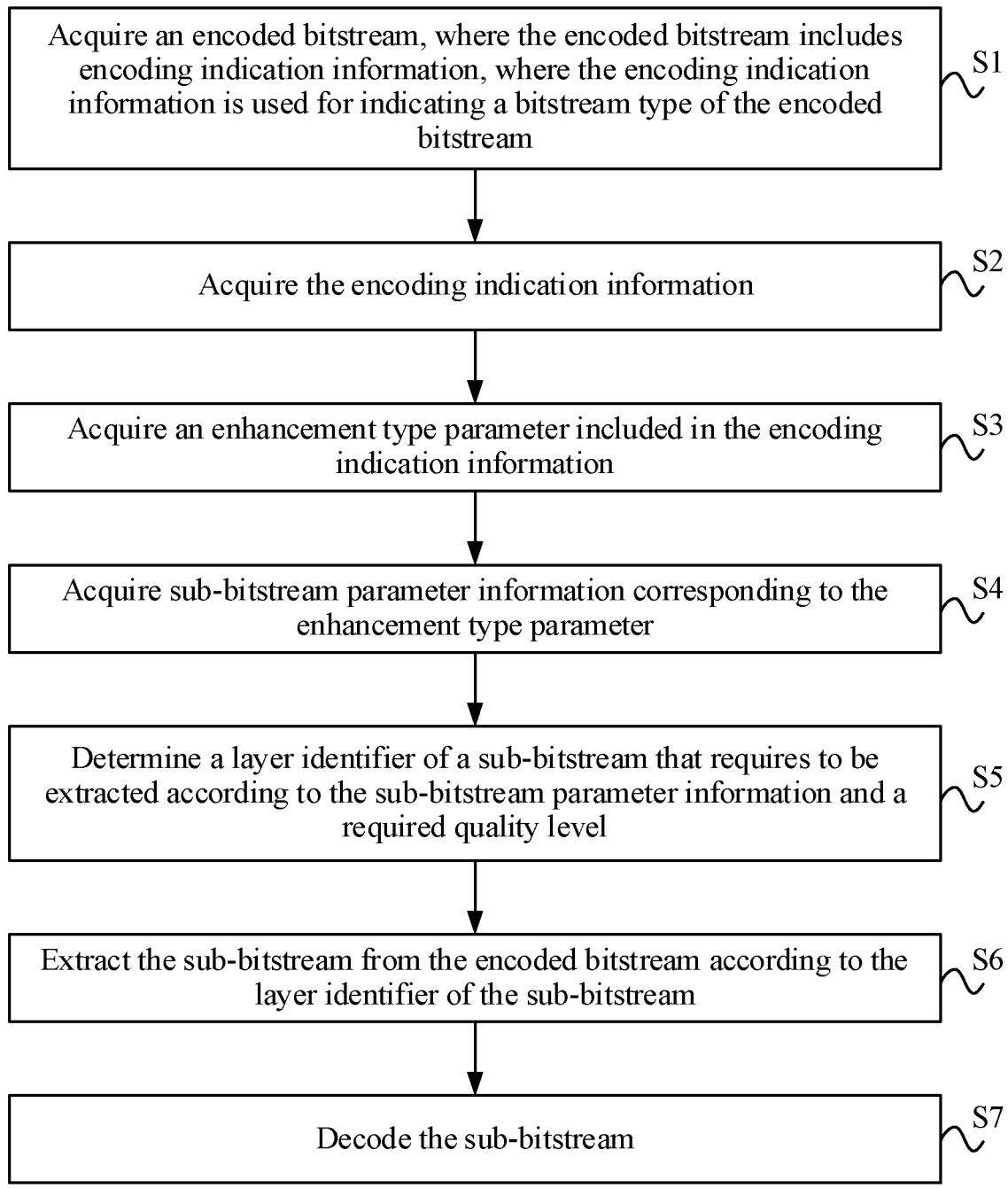
FIG. 2 is a flowchart of another method for processing a bitstream according to an embodiment of the present application.

FIG. 2 is a flowchart of another method for processing a bitstream according to an embodiment of the present application. Referring to FIG. 2, the method includes the following.

In S1, an encoded bitstream is acquired, where the encoded bitstream includes encoding indication information, where the encoding indication information is used for indicating a bitstream type of the encoded bitstream.

In S2, the encoding indication information is acquired.

In S3, an enhancement type parameter included in the encoding indication information is acquired.

In S4, sub-bitstream parameter information corresponding to the enhancement type parameter is acquired.

In S5, a layer identifier of a sub-bitstream that requires to be extracted is determined according to the sub-bitstream parameter information and a required quality level.

In S6, the sub-bitstream is extracted from the encoded bitstream according to the layer identifier of the sub-bitstream.

In S7, the sub-bitstream is decoded.

In this embodiment, a correspondence relationship exists between the enhancement type parameter and the sub-bitstream parameter information, and a correspondence relationship exists between the quality level and the layer identifier. In this embodiment, the sub-bitstream parameter information may be queried based on the quality level required by the user, and the layer identifier of the sub-bitstream that requires to be extracted and corresponds to the required quality level is determined. The required quality level may be considered as a required picture quality level after decoding.

Figure 3:
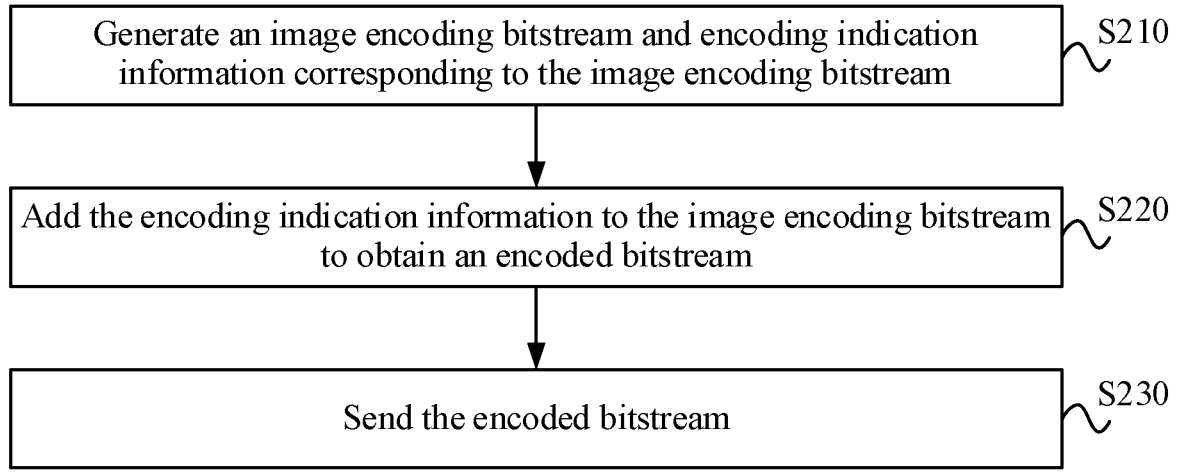
FIG. 3 is a flowchart of another method for processing a bitstream according to an embodiment of the present application.

In an exemplary embodiment, the present application further provides a method for processing a bitstream. FIG. 3 is a flowchart of another method for processing a bitstream according to an embodiment of the present application. The method is applicable to the case of reducing the decoding overhead and may be integrated in an apparatus for processing a bitstream. The apparatus may be implemented by software and/or hardware and is integrated in a terminal device. For details not described in this embodiment, reference may be made to the preceding embodiments. As shown in FIG. 3, the method for processing a bitstream according to this embodiment of the present application includes the following.

In S210, an image encoding bitstream and encoding indication information corresponding to the image encoding bitstream are generated.

In this embodiment, the image encoding bitstream may be a multilayer encoding bitstream or a non-multilayer encoding bitstream. In the case where the image encoding bitstream is a non-multilayer encoding bitstream, the image encoding bitstream may be a termination bitstream.

The cases of determining the generation of a multilayer encoding bitstream for an image include, but are not limited to, the following three types: 1) The image includes an indication that multilayer encoding is required, for example, indicating that the image is a key picture, and that multilayer encoding requires to be performed on the image; 2) the encoding end analyzes the image characteristics and determines that multilayer encoding is required according to the image characteristics; 3) the image is included in the persistent scope of an SEI message corresponding to the previous indication multilayer encoding image.

The cases of determining the generation of a termination bitstream for the image should satisfy that the image is included in the persistent scope of the SEI message corresponding to the previous indication multilayer encoding image and/or simultaneously satisfy one of the following conditions: 1) The encoding end analyzes the image characteristics and determines that multilayer encoding is not required according to the image characteristics; 2) the image includes an indication that multilayer encoding is terminated.

The sequence of generating the encoding indication information and generating the image encoding bitstream is not limited in this embodiment. In this step, the encoding indication information is generated to reduce the overhead when decoding.

In this embodiment, the encoding indication information includes the SEI message.

In S220, the encoding indication information is added to the image encoding bitstream to obtain an encoded bitstream.

The position where the encoding indication information is added to the image encoding bitstream is not limited as long as the decoding end can acquire it.

In S230, the encoded bitstream is sent.

In this embodiment, the terminal device may be considered as a encoding end device. In this step, the encoded bitstream may be sent to the decoding end device.

In the method for processing a bitstream according to the present application, the image encoding bitstream and the encoding indication information corresponding to the image encoding bitstream are generated, the encoding indication information is added to the image encoding bitstream to obtain the encoded bitstream, and the encoded bitstream is sent so that the decoding overhead can be reduced by adding the encoding indication information to the bitstream.

Based on the preceding embodiment, variant embodiments of the preceding embodiment are provided. For the brevity of description, only differences from the preceding embodiment are described in the variant embodiments.

In an embodiment, in the case where the image encoding bitstream is a multilayer encoding bitstream, the encoding indication information includes at least one of: an enhancement type parameter, sub-bitstream parameter information, keyframe identifier information, cancellation identifier indication information, or persistence identifier information.

In the case where the encoding indication information includes the SEI message, the at least one of the enhancement type parameter, the sub-bitstream parameter information, the keyframe identifier information, the cancellation identifier indication information, or the persistence identifier information included in the encoding indication information may be included in the SEI message.

In an embodiment, in the case where the image encoding bitstream is within the persistent scope of the previous encoding indication information, and image end encoding corresponding to the image encoding bitstream is a multilayer encoding bitstream, the encoding indication information includes the cancellation identifier indication information, and the image encoding bitstream is a multilayer encoding bitstream or a termination bitstream.

In the case where the encoding indication information includes the SEI message, the cancellation identifier indication information included in the encoding indication information may be included in the SEI message.

In an embodiment, the encoding indication information is used for generating a multilayer encoding bitstream, or the encoding indication information is acquired after a multilayer encoding bitstream is generated.

The present application is described below illustratively. The method for processing a bitstream according to the present application may be considered as a method for processing a multilayer encoding video bitstream. In the solution of the present application, a basic encoding bitstream is provided for a conventional picture, while a multilayer encoding bitstream is provided for the key picture, and an indication of encoding bitstream layer information corresponding to the key picture is provided in high-level semantics such as the SEI message so that the decoding end can select a proper encoding bitstream layer or a combination of encoding bitstream layers in the multilayer encoding bitstream for decoding and playing in the case where the bitstream does not require to be deeply decoded, achieving the effect of providing the content of low quality for the conventional surveillance picture and providing the content of high quality for the key surveillance picture. When multiple display terminals having different capabilities locally exist, after receiving a channel of multilayer encoding surveillance bitstream, according to the indication in the bitstream, the user side may select different encoding bitstream layers or combinations of encoding bitstream layers in the multilayer encoding bitstream for different display terminals for decoding and playing.

In the present application, to provide the indication of the encoding bitstream layer information corresponding to the key picture in the high-level semantics, the SEI message is used as an example for illustration in the subsequent solution, but other modes that may be used for indicating the encoding bitstream layer information corresponding to the key picture are not excluded, including, but not limited to, performing indication in the file encapsulation of the bitstream.

Embodiment One

A method for processing a bitstream, applied to the decoding end, may include the following.

In step 1, a to-be-decoded bitstream is received, and a cross-layer indication SEI message corresponding to the to-be-decoded bitstream is acquired.

The decoding end receives the to-be-decoded bitstream, that is, the encoded bitstream. The to-be-decoded bitstream includes a cross-layer indication SEI message (that is, a cross_layer_indication SEI message) proposed in the present application. The cross-layer indication SEI message is used for indicating that a bitstream associated with the cross-layer indication SEI message is a multilayer encoding bitstream. The cross-layer indication SEI message may be considered as an SEI message newly added by the standard.

To better explain the process of parsing the SEI message, the content related to the SEI message encapsulation in the H.266/VVC version 1 standard is first supplemented below, from which the solution of the present application can be better understood. Before acquiring the SEI message, the decoding end first acquires a Network Abstraction Layer (NAL) unit from the to-be-decoded bitstream. The NAL unit is the most basic syntax structure in the bitstream. Each NAL unit includes header information (that is, nal_unit_header) and raw byte sequence payload (RBSP) information. The header information in the NAL unit includes NAL unit type information (that is, nal_unit_type). When the value of nal_unit_type is 23, the NAL unit is indicated as PREFIX_SEI_NUT, that is, a front SEI message. When the value of nal_unit_type is 24, the NAL unit is indicated as SUFFIX_SEI_NUT, that is, a rear SEI message. In the solution of the present application, the cross-layer indication SEI message is not limited to be PREFIX_SEI_NUT or SUFFIX_SEI_NUT. When an NAL unit type is an SEI message, RBSP data in the NAL unit is parsed according to the syntax structure of a raw byte sequence payload (RBSP) corresponding to the SEI message. One SEI RBSP may include one or one SEI messages (that is, sei_message). A syntax element payload_type included in the syntax structure denotes the type of the SEI message.

After the type of the SEI message is determined, parameter information to be transmitted by the SEI message may be obtained by parsing according to the sei_payload( ) syntax structure corresponding to the type of the SEI message. The value of payloadType of the cross-layer indication SEI message is different from the value of the SEI message already defined in the current H.266/VVC version 1 (for example, the value is 8). The decoding end may acquire the cross-layer indication SEI message through the preceding parsing. Since the syntax structure and parsing process is a standard course before a specific type of SEI message is acquired, details are not repeated in the subsequent description, and the description is directly started from the payload syntax structure of the related SEI message.

In step 2, through the cross-layer indication SEI message, the to-be-decoded bitstream is determined to be a to-be-extracted bitstream, and an enhancement layer sub-bitstream type included in the to-be-extracted bitstream is determined.

When the cross-layer indication SEI message appears in the bitstream, this indicates that the received to-be-decoded bitstream is a multilayer encoding bitstream, and a sub-bitstream extraction process requires to be performed on the to-be-decoded bitstream, so the to-be-decoded bitstream may also be called the to-be-extracted bitstream at this time.

When being a multilayer encoding bitstream, the video bitstream may include the base layer sub-bitstream and the at least one enhancement layer sub-bitstream. The at least one enhancement layer sub-bitstream may be an independent enhancement layer sub-bitstream or a dependent enhancement layer sub-bitstream. The base layer sub-bitstream may be independently decoded to provide the video content of basic quality. The independent enhancement layer sub-bitstream may be independently decoded to provide the video content of relatively high quality. The dependent enhancement layer sub-bitstream requires to be decoded with the base layer sub-bitstream to provide the video content of relatively high quality. Therefore, to better perform the sub-bitstream extraction process, an enhancement type parameter (that is, enhancement_type) is also required to be acquired from the cross-layer indication SEI message. The enhancement type parameter (that is, enhancement_type) is used for indicating the enhancement layer sub-bitstream type included in the to-be-extracted bitstream. Table 1 describes the payload syntax structure table of the cross-layer indication SEI message.

TABLE 1

| Payload syntax structure table of cross-layer indication SEI message | |
|---|---|
| | Description |
| cross_layer_indication( payloadSize ) {<br>  cli_enhancement_type<br>} | u(3) |

The enhancement type parameter, that is, cli_enhancement_type, is used for indicating the enhancement layer sub-bitstream type included in the to-be-extracted bitstream. Table 2 describes the corresponding table between values and corresponding meanings of the enhancement layer sub-bitstream type.

TABLE 2

Corresponding table between value and corresponding
meaning of the enhancement layer sub-bitstream type

| Value of the Enhancement Type Parameter | Meaning Corresponding to Value of the Enhancement Type Parameter |
|---|---|
| 0 | Enhancement layer sub-bitstream of the to-be-extracted bitstream only includes an independent enhancement layer type |
| 1 | The enhancement layer sub-bitstream of the to-be-extracted bitstream only includes a dependent enhancement layer type |
| 2 | The enhancement layer sub-bitstream of the to-be-extracted bitstream simultaneously includes the dependent enhancement layer type and independent enhancement layer type |
| 3 . . . 7 | Reserved |

When the value of cli_enhancement_type is equal to 0, this indicates that the enhancement layer sub-bitstream of the to-be-extracted bitstream only includes the independent enhancement layer type. When the value of cli_enhancement_type is equal to 1, this indicates that the enhancement layer sub-bitstream of the to-be-extracted bitstream only includes the dependent enhancement layer type. When the value of cli_enhancement_type is equal to 2, this indicates that the enhancement layer sub-bitstream of the to-be-extracted bitstream simultaneously includes the dependent enhancement layer type and independent enhancement layer type.

In step 3, according to the enhancement layer sub-bitstream type included in the to-be-extracted bitstream, the sub-bitstream parameter information corresponding to the type is acquired, and according to the sub-bitstream parameter information, an identifier of a sub-bitstream that requires to be extracted is determined.

The sub-bitstream parameter information may include an enhancement layer number parameter (that is, num_enhancement_layers), that is, the number of enhancement layer sub-bitstreams, a quality level parameter (that is, quality_level_idx) and a layer identifier of a sub-bitstream corresponding to each quality level.

The number of enhancement layer sub-bitstreams (that is, num_enhancement_layers) is used for indicating the number of enhancement layers included in the to-be-extracted bitstream. The quality level parameter (that is, quality_level_idx) is used for indicating a quality level set that may be provided by sub-bitstream in the to-be-extracted bitstream.

Table 3 describes the schematic table of the relationship between a quality level and a corresponding set according to an embodiment of the present application. Referring to Table 3, when the quality level parameter, that is, quality_level_idx, is equal to 0, this indicates that the sub-bitstream in the to-be-extracted bitstream may only provide videos of basic quality. When quality_level_idx is equal to 1, this indicates that the sub-bitstream in the to-be-extracted bitstream may simultaneously provide videos of basic quality and medium quality. When quality_level_idx is equal to 2, this indicates that the sub-bitstream in the to-be-extracted bitstream may simultaneously provide videos of basic quality, medium quality and high quality.

TABLE 3

Schematic table of relationship between quality level and corresponding
set according to an embodiment of the present application

| Quality Level Parameter | Quality Level Set Corresponding to the Quality Level Parameter |
|---|---|
| 0 | Indicating that the sub-bitstream in the to-be-extracted bitstream may only provide videos of basic quality |
| 1 | Indicating that the sub-bitstream in the to-be-extracted bitstream may simultaneously provide videos of basic quality and medium quality |
| 2 | Indicating that the sub-bitstream in the to-be-extracted bitstream may simultaneously provide videos of basic quality, medium quality and high quality |
| 3 | Reserved |

After the quality level set that may be provided by the sub-bitstream in the to-be-extracted bitstream is determined, the user side selects a proper quality level from the quality level set according to an actual case (such as an input instruction, pre-configuration and device capability) and acquires a layer identifier list corresponding to the selected quality level. The layer identifier list corresponding to the quality level is the layer identifier of the sub-bitstream that requires to be extracted.

As described in step 2, there are three enhancement layer sub-bitstream types included in the to-be-extracted bitstream. A layer identifier list corresponding to each quality level in the quality level set and the process of determining the identifier of the sub-bitstream that requires to be extracted are illustrated below for the three different types.

Example 1, when cli_enhancement_type is equal to 0, the to-be-extracted bitstream only includes the independent enhancement layer sub-bitstream.

At this time, both the base layer sub-bitstream and the enhancement layer sub-bitstream in the to-be-extracted bitstream may be independently decoded, so a bitstream layer identifier list corresponding to the quality level has only one bitstream layer identifier. Table 4 describes the corresponding table between a quality level and a layer identifier according to the present application.

TABLE 4

Corresponding table between quality level and layer
identifier according to the present application

| Quality Level | Layer Identifier List Corresponding to the Quality Level |
|---|---|
| 0 (Picture of Basic Quality) | Layer 0 |
| 1 (Picture of Medium Quality) | Layer 1 |
| 2 (Picture of High Quality) | Layer 2 |

Referring to Table 4, when the client selects the picture of basic quality, the corresponding bitstream identifier list only includes layer 0, so layer 0 is the layer identifier of the sub-bitstream that requires to be extracted, and a sub-bitstream whose bitstream layer identifier is layer 0 is the sub-bitstream that requires to be extracted.

When the client selects the picture of medium quality, the corresponding bitstream identifier list only includes layer 1, so layer 1 is the layer identifier of the sub-bitstream that requires to be extracted, and a sub-bitstream whose bitstream layer identifier is layer 1 is the sub-bitstream that requires to be extracted.

When the client selects the picture of high quality, the corresponding bitstream identifier list only includes layer 2, so layer 2 is the layer identifier of the sub-bitstream that requires to be extracted, and a sub-bitstream whose bitstream layer identifier is layer 2 is the sub-bitstream that requires to be extracted.

Example 2, when cli_enhancement_type is equal to 1, the to-be-extracted bitstream only includes the dependent enhancement layer sub-bitstream.

Since the dependent enhancement layer sub-bitstream may not be independently decoded, the dependent enhancement layer sub-bitstream must be decoded with the base layer sub-bitstream. Therefore, the bitstream identifier list corresponding to the quality levels (except for the basic quality) includes at least two bitstream layer identifiers, and the bitstream identifier list corresponding to the basic quality may only include one bitstream layer identifier.

Table 5 describes the corresponding table between another quality level and a layer identifier according to the present application.

TABLE 5

Corresponding table between another quality level and layer identifier according to the present application

| Quality Level | Layer Identifier List Corresponding to the Quality Level |
| --- | --- |
| 0 (Picture of Basic Quality) | Layer 0 |
| 1 (Picture of Medium Quality) | Layer 0 and layer 1 |
| 2 (Picture of High Quality) | Layer 0 and layer 2, or layer 0, layer 1 and layer 2 |

Referring to Table 5, when the user selects the picture of basic quality, the corresponding bitstream identifier list only includes layer 0, so layer 0 is the layer identifier of the sub-bitstream that requires to be extracted, and a sub-bitstream whose bitstream layer identifier is layer 0 is the sub-bitstream that requires to be extracted.

When the user selects the picture of medium quality, the corresponding bitstream identifier list simultaneously includes layer 0 and layer 1, so layer 0 and layer 1 are layer identifiers of the sub-bitstream that requires to be extracted, and a sub-bitstream whose bitstream layer identifiers are layer 0 and layer 1 is the sub-bitstream that requires to be extracted.

When the user selects the picture of high quality, the corresponding bitstream identifier list simultaneously includes layer 0 and layer 2, so layer 0 and layer 2 are layer identifiers of the sub-bitstream that requires to be extracted, and a sub-bitstream whose bitstream layer identifiers are layer 0 and layer 2 is the sub-bitstream that requires to be extracted.

Alternatively, when the user selects the picture of high quality, the corresponding bitstream identifier list simultaneously includes layer 0, layer 1 and layer 2, so layer 0, layer 1 and layer 2 are layer identifiers of the sub-bitstream that requires to be extracted, and a sub-bitstream whose bitstream layer identifiers are layer 0, layer 1 and layer 2 is the sub-bitstream that requires to be extracted.

The bitstream identifier list corresponding to the basic quality may also include more than one bitstream layer identifier. Table 6 describes the table showing the correspondence between another quality level and a layer identifier according to the present application.

TABLE 6

Table showing the correspondence between another quality level and layer identifier according to the present application

| Quality Level | Layer Identifier List Corresponding to the Quality Level |
| --- | --- |
| 0 (Picture of Basic Quality) | Layer 0 and layer 1 |
| 1 (Picture of Medium Quality) | Layer 0, layer 1 and layer 2, or layer 0 and layer 2 |
| 2 (Picture of High Quality) | Layer 0, layer 1, layer 2 and layer 3 or another possible combination |

Referring to Table 6, when the user selects the picture of basic quality, the corresponding bitstream identifier list simultaneously includes layer 0 and layer 1, so layer 0 and layer 1 are layer identifiers of the sub-bitstream that requires to be extracted, and a sub-bitstream whose bitstream layer identifiers are layer 0 and layer 1 is the sub-bitstream that requires to be extracted.

Example 3, when cli_enhancement_type is equal to 2, the to-be-extracted bitstream simultaneously includes the independent enhancement layer sub-bitstream and the dependent enhancement layer sub-bitstream.

Since the to-be-extracted bitstream simultaneously includes the independent enhancement layer sub-bitstream and the dependent enhancement layer sub-bitstream, the bitstream identifier list corresponding to the quality level may include one or more bitstream layer identifiers. Table 7 describes the table showing the correspondence between another quality level and a layer identifier according to the present application.

TABLE 7

Table showing the correspondence between another quality level and layer identifier according to the present application

| Quality Level | Layer Identifier List Corresponding to the Quality Level |
| --- | --- |
| 0 (Picture of Basic Quality) | Layer 0 |
| 1 (Picture of Medium Quality) | Layer 1 |
| 2 (Picture of High Quality) | Layer 1 and layer 2, or layer 0 and layer 2 |

Referring to Table 7, when the user selects the picture of medium quality, the corresponding bitstream identifier list only includes layer 1, so layer 1 is the layer identifier of the sub-bitstream that requires to be extracted, and a sub-bitstream whose bitstream layer identifier is layer 1 is the sub-bitstream that requires to be extracted.

When the user selects the picture of high quality, the corresponding bitstream identifier list simultaneously may include layer 1 and layer 2, so layer 1 and layer 2 are layer identifiers of the sub-bitstream that requires to be extracted, and a sub-bitstream whose bitstream layer identifiers are layer 1 and layer 2 is the sub-bitstream that requires to be extracted.

The number of identifiers of the sub-bitstream that requires to be extracted included in the bitstream identifier list corresponding to the quality level should not be greater than the number indicated by the preceding enhancement layer sub-bitstream number parameter (that is, num_enhancement_layers)

In step 4, the sub-bitstream that requires to be extracted is extracted from the to-be-extracted bitstream according to the identifier of the sub-bitstream that requires to be extracted.

Extracting the sub-bitstream from the complete bitstream according to the identifier of the sub-bitstream belongs to the related technologies defined in the standards, and those skilled in the art may implement this according to the content of the standard protocol. The extraction process is not described in detail in the solution.

Since a parameter set is a significant syntax structure in the video encoding and decoding standards, the parameter set may include the public information required in the encoding and decoding processes, such as a flag and public parameter information (such as the maximum layers (e.g. max layers)). When the solution of the present application is practically applied, it is required to ensure that the values of related parameters in the parameter set are set to be consistent with those of parameters in the cross-layer indication SEI message. For example, when the value of cli_enhancement_type in the cross-layer indication SEI message is equal to 0, the value of vps_all_independent_layers_flag in a video parameter set associated with the to-be-extracted bitstream associated with the cross-layer indication SEI message should be 1; and when the value of cli_enhancement_type in the cross-layer indication SEI message is not equal to 0, the value of vps_all_independent_layers_flag in the video parameter set associated with the to-be-extracted bitstream associated with the cross-layer indication SEI message should be 0. For another example, the value of the maximum layers parameter vps_max_layers_minus1 in the video parameter set should be consistent with the value of the number of enhancement layer sub-bitstreams num_enhancement_layers in the cross-layer indication SEI message.

Embodiment Two

This embodiment provides an example of the syntax structure and semantic information of the cross-layer indication SEI message, which may correspond to the capability described in embodiment one. Table 8 describes the syntax structure table of a cross-layer indication SEI message according to the present application.

TABLE 8

Syntax structure table of cross-layer indication SEI message according to the present application

| | Description |
|---|---|
| cross_layer_indication( payloadSize ) { | |
|   cli_enhancement_type | u(3) |
|   cli_num_enhancement_layers | ue(v) |
|   for( i = 1; i <= cli_num_enhancement_layers; i++ ) | |
|     cli _layer_id[ i ] | u(6) |
|   cli_quality_level_idx | ue(v) |
|   if(cli_enhancement_type == 0){ | |
|     for(i=0; i <= cli_quality_level_idx; i++) | |
|       cli_extractable_layer_id[i] | u(6) |
|   }else{ | |
|     for(i=0; i <= quality_level_idx; i++){ | |
|       for (j=0; j <=num_enhancement_layers; j++ ) | |
|         cli_extractable_layer_flag[i][j] | u(1) |
|     } | |
|   } | |
| } | |

Referring to Table 8, the enhancement type parameter, that is, cli_enhancement_type, is used for indicating the type of the enhancement layer sub-bitstream in the to-be-decoded bitstream associated with the SEI message, and as described in embodiment one, when cli_enhancement_type=0, this indicates that the to-be-decoded bitstream only includes the independent enhancement layer sub-bitstream. When cli_enhancement_type=1, this indicates that the to-be-decoded bitstream only includes the dependent enhancement layer sub-bitstream. When cli_enhancement_type=2, this indicates that the to-be-decoded bitstream simultaneously includes the independent enhancement layer sub-bitstream and the dependent enhancement layer sub-bitstream.

The enhancement layer number parameter, that is, cli_num_enhancement_layers, indicates the number of the enhancement layer sub-bitstreams in the to-be-decoded bitstream associated with the SEI message.

The layer identifier, that is, cli_layer_id[i], indicates a layer identifier of the ith sub-bitstream.

The quality level parameter, also called the quality level, that is, cli_quality_level_idx, indicates the quality level (or quality set) that may be provided by the sub-bitstream in the to-be-extracted bitstream, as described in embodiment one.

The layer identifier corresponding to the quality level, that is, cli_extractable_layer_id[i], is configured for indicating a layer identifier of a corresponding extractable sub-bitstream when the quality level is i. At this time, the enhancement layer type in the to-be-decoded bitstream associated with the SEI message should be the independent enhancement type, that is, cli_enhancement_type=0.

cli_extractable_layer_id[i] may also be denoted as cli_extractable_layer_id[i][0], indicating the layer identifier of the corresponding extractable sub-bitstream when the quality level is i.

cli_extractable_layer_flag[i][j] is configured for indicating an extractable flag of the jth layer sub-bitstream when the quality level is i. When its value is equal to 1, this indicates that the jth layer sub-bitstream is the extractable sub-bitstream when the quality level is i; and when its value is equal to 0, this indicates that the jth layer sub-bitstream is not the extractable sub-bitstream when the quality level is i. All sub-bitstream layer identifiers corresponding to j and satisfying that cli_extractable_layer_flag[i][j] is equal to 1 constitute a corresponding extractable sub-bitstream identifier list when the quality level i.

This embodiment only provides the syntax structure example of a feasible cross-layer indication SEI message. All SEI messages conforming to all or part of the solution described in embodiment one are within the protection scope of the solution of the present application.

Embodiment Three

Based on embodiment one, a keyframe flag is added in this embodiment. A keyframe flag in the cross-layer indication SEI message is used for indicating whether the to-be-decoded bitstream requires to involve a cross-layer operation. Such a specific type of SEI message (that is, the SEI message in embodiment two) does not indicate any information itself. When the to-be-decoded bitstream includes the cross-layer indication SEI message, the keyframe flag requires to be parsed. The cross-layer indication SEI message may also include a cancellation flag (that is, cli_cancel_flag) and a persistence flag (that is, cli_persistence_flag). Table 9 describes the syntax structure table of another cross-layer indication SEI message according to the present application.

Referring to Table 9, the value of the cancellation identifier indication information, that is, cli_cancel_flag, is equal to 1, this indicates that the cross-layer indication SEI message cancels the persistence of any previous cross-layer indication SEI message and does not use the relevant SEI function. Otherwise, when the value is equal to 0, this indicates that the cross-layer indication information such as first multilayer encoding parameter information is immediately followed.

The persistence identifier information, that is, cli_persistence_flag, is used for indicating the persistence of the current cross-layer indication SEI message. When the value of the persistence flag (that is, cli_persistence_flag) is equal to 0, this indicates that the cross-layer indication SEI message is only applicable to the currently decoded (sub) image. When the value of the persistence flag (that is, cli_persistence_flag) is equal to 1, this is configured for indicating that the cross-layer indication SEI message is applicable not only to the currently decoded (sub) image, but also to the subsequent decoded (sub) image within the persistent scope.

For example, the persistent scope of the cross-layer indication SEI information may be an access unit (AU), may also be an encoded video sequence (CVS), or may also be unspecified. This is not limited in the present application.

When the value of the keyframe identifier information, that is, cli_key_frame_flag, is equal to 1, this indicates that the to-be-decoded bitstream is a multilayer encoding bitstream, and the sub-bitstream extraction process requires to be performed on the to-be-decoded bitstream according to the enhancement layer type, so the to-be-decoded bitstream may also be denoted as the to-be-extracted bitstream. Otherwise, when the value is equal to 0, this indicates that the to-be-decoded bitstream is a non-multilayer encoding bitstream, and the corresponding operation is performed on the to-be-decoded bitstream according to the original basic decoding process in the standards.

cli_extractable_layer_flag[i][j] indicates the extractable flag of the j-th layer sub-bitstream when the quality level is i. When its value is equal to 1, this indicates that the j-th layer sub-bitstream is the extractable sub-bitstream when the quality level is 1; and when its value is equal to 0, this indicates that the jth layer sub-bitstream is not the extractable sub-bitstream when the quality level is i. All sub-bitstream layer identifiers corresponding to j and satisfying that cli_extractable_layer_flag[i][j] is equal to 1 constitute the corresponding extractable sub-bitstream identifier list when the quality level i.

Different from embodiment two, in this embodiment, cli_extractable_layer_flag[i][j] is uniformly used for indicating the extractable flag of the j-th layer sub-bitstream when the quality level is i. However, since cli_enhancement_type=0, at this time, the enhancement layer sub-bitstream type in the to-be-decoded bitstream associated with the SEI message should be the independent enhancement type. Therefore, each quality level corresponds to only one extractable sub-bitstream. As long as one j exists to enable the value of cli_extractable_layer_flag[i][j] to be 1, the jth layer sub-bitstream is the corresponding extractable sub-bitstream when the level is i, and there is no need to continue the do cycle.

TABLE 9

Syntax structure table of another cross-layer indication SEI message according to the present application

| | Description |
|---|---|
| cross_layer_indication( payloadSize ) { | |
|   cli_cancel_flag | u(1) |
|   if( ! cli_cancel_flag) { | |
|     cli_key_frame_flag | u(1) |
|     cli_persistence_flag | u(1) |
|     cli_enhancement_type | u(3) |
|     cli_num_enhancement_layers | ue(v) |
|     for( i = 1; i <= cli_num_enhancement_layers; i++ ) | |
|       cli _layer_id[ i ] | u(6) |
|     cli_quality_level_idx | ue(v) |

TABLE 9-continued

Syntax structure table of another cross-layer indication SEI message according to the present application

| | Description |
|---|---|
|     if(cli_enhancement_type == 0){ | |
|       for(i=0; i <= cli_quality_level_idx; i++){ | |
|         do{ | |
|           j = 0 | |
|           cli_extractable_layer_flag[i][j] | u(6) |
|           j ++ | |
|         }while(!cli_extractable_layer_id[i][j] ) | |
|       } | |
|     }else{ | |
|       for(i=0; i <= quality_level_idx; i++){ | |
|       for (j=0; j <=num_enhancement_layers; j++ ) | |
|         cli_extractable_layer_flag[i][j] | u(1) |
|     } | |
|   } | |
| } | |

Embodiment Four

This embodiment provides an example of the syntax structure and semantic information of another cross-layer indication SEI message. Two special SEI message types existing in the H.266/VVC version 1 standard are used for performing the solution of the present application. These two special SEI message types are a user data registered SEI message (payloadType=4), where the user data is registered as specified in Recommendation ITU-T T.35 and a user data unregistered SEI message (payloadType=5). The syntax structures and semantic information are shown in Tables 10 and 11. Table 10 describes the syntax structure table of another SEI message according to the present application. Table 11 describes the syntax structure table of another SEI message according to the present application.

TABLE 10

Syntax structure table of another SEI message according to the present application

| | Description |
|---|---|
| user_data_registered_itu_t_t35( payloadSize ) { | |
|   itu_t_t35_country_code | b(8) |
|   if( itu_t_t35_country_code != 0xFF ) | |
|     i = 1 | |
|   else { | |
|     itu_t_t35_country_code_extension_byte | b(8) |
|     i = 2 | |
|   } | |
|   do { | |
|     itu_t_t35_payload_byte | b(8) |
|     i++ | |
|   } while( i < payloadSize ) | |
| } | |

TABLE 11

Syntax structure table of another SEI message according to the present application

| | Description |
|---|---|
| user_data_unregistered( payloadSize ) { | |
|   uuid_iso_iec_11578 | u(128) |
|   for( i = 16; i < payloadSize; i++ ) | |
|     user_data_payload_byte | b(8) |
| } | |

Similar to the user data SEI message, where the user data is registered by the ITU-T Recommendation T.35, the solution of the present application may be implemented by a syntax element user_data_payload_byte in the user data unregistered SEI message. For example, the syntax element user_data_payload_byte may include the capability mentioned in embodiment one or include all or part of the content in the SEI message exemplified in embodiment two, so as to achieve the purpose of implementing the solution of the present application.

In addition to that the user data SEI message, where the user data is registered by the ITU-T Recommendation T.35, and the user data unregistered SEI message both existing in the H.266/VVC version 1 standard may be used for implementing the solution of the present application through the syntax elements itu_t_t35_payload_byte and user_data_payload_byte, any other extensions of implementing the solution of the present application using these two SEI messages are also supported.

Embodiment Five

This embodiment provides a method for encoding a video, and the method is applied to a terminal device that codes a video. The input of the device is an image included in the video, and the output of the device is an image bitstream or a transmission stream or a media file including an image bitstream.

The method for encoding in this embodiment includes the following.

In S1, an image is read, where the image is a complete image in a video sequence or a sub-image in a complete image.

In S2, whether the image involves multilayer encoding is determined, if so, S3 is executed, otherwise S5 is executed.

The methods for determining whether the image involves multilayer encoding include, but are not limited to, the following three types: 1) The read image includes an indication that multilayer encoding is required, for example, indicating that the image is a key picture, and that multilayer encoding requires to be performed on the image; 2) the encoding end analyzes the image characteristics and determines that multilayer encoding is required according to the image characteristics; 3) the read image is included in the persistent scope (that is, persistent_scope) of a cross-layer indication SEI message corresponding to the previous indication multilayer encoding image.

Multilayer encoding may be considered as encoding the image into a multilayer bitstream.

In S3, first multilayer encoding parameter information is acquired.

The first multilayer encoding parameter information includes the enhancement type parameter, the enhancement layer number parameter, the quality level parameter (that is, quality_level_idx) and the bitstream layer identifier corresponding to the quality level.

The user data SEI message, where the user data is registered by the ITU-T Recommendation T.35 includes user data registered according to provisions in the ITU-T Recommendation T.35.

The solution of the present application may be implemented through the syntax element itu_t_t35_payload_byte in the SEI message. For example, the syntax element itu_t_t35_payload_byte may include the capability mentioned in embodiment one or include all or part of the content in the SEI message exemplified in embodiment two, so as to achieve the purpose of implementing the solution of the present application.

In S4, a multilayer encoding bitstream is generated for image encoding, and S8 is executed.

The encoding method may be implemented by related technologies and is not limited in the present application. The generated multilayer encoding bitstream should satisfy the first multilayer encoding parameter information. In addition, the sequence between S3 and S4 is not limited in the present application.

In S5, whether the image is used for ending the multilayer encoding is determined, if so, S6 is executed, otherwise S7' is executed.

The methods for determining whether the image is used for ending the multilayer encoding include, but are not limited to, the following three types: 1) The read image includes an indication that the multilayer encoding requires to be ended; 2) the encoding end analyzes the image characteristics and determines that the multilayer encoding requires to be ended according to the image characteristics; 3) the encoding end analyzes the image characteristics and determines that the multilayer encoding is not required, but the read image is still included in the persistent scope (that is, persistent_scope) of the cross-layer indication SEI message corresponding to the previous indication multilayer encoding image.

In S6, second multilayer encoding parameter information is acquired.

The second multilayer encoding parameter information at least includes a cancellation flag (e.g. cancel_flag), that is, the cancellation identifier indication information.

In S7/S7', a bitstream is generated for the image encoding.

The encoding method may be implemented by related technologies and is not limited in the present application. In addition, the sequence between S6 and S7 is not limited in the present application.

In S8, an SEI message carrying pieces of multilayer encoding parameter information is written into the bitstream.

An SEI message carrying the first multilayer encoding parameter information or the second multilayer encoding parameter information is written into the bitstream. The SEI message carrying the first multilayer encoding parameter information or the second multilayer encoding parameter information may be any of the SEI message examples described in embodiments two to four.

The pieces of multilayer encoding parameter information include the first multilayer encoding parameter information and the second multilayer encoding parameter information. The first multilayer encoding parameter information is added to the multilayer encoding bitstream generated based on S4, and the second multilayer encoding parameter information is added to the bitstream generated based on S7.

When the SEI message carries the first multilayer encoding parameter information, and the SEI message carrying the first multilayer encoding parameter information includes the persistence scope parameter (e.g. persistence_scope), the encoding end may also detect whether the first multilayer encoding parameter information is identical to third multilayer encoding parameter information in the previous SEI message carrying pieces of multilayer encoding parameter information. If the first multilayer encoding parameter information is identical to the third multilayer encoding parameter information, and the persistence scope (e.g. persistence_scope) of an SEI message carrying the third multilayer encoding parameter information includes the current image, the encoding end may choose not to write the SEI message carrying the first multilayer encoding parameter information into the bitstream.

In S9, an image bitstream or a transmission stream or a media file including an image bitstream is output.

As video surveillance plays a more and more significant role in urban security, video data requiring transmission and storage is also increasing, so how to achieve fast transmission and extend the storage duration of key videos with maximum efficiency becomes more and more significant. Especially with the constant development and maturity of real-time intelligent analysis technologies, it is an inevitable trend to fast distinguish a key picture from other pictures in a video stream, save details in the key picture as much as possible using high quality encoding and reduce the quality of a common picture. The solution of the present application is an optimization of the encoding and decoding standards to achieve the preceding purposes. Therefore, the solution has a clear future application prospect and a relatively large market space.

Figure 4:
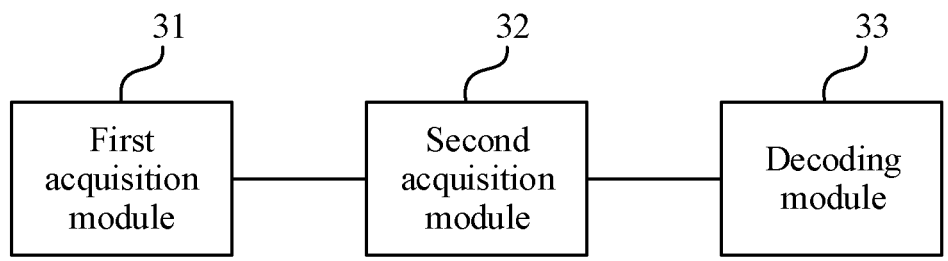
FIG. 4 is a diagram illustrating the structure of an apparatus for processing a bitstream according to an embodiment of the present application.

In an exemplary embodiment, FIG. 4 is a diagram illustrating the structure of an apparatus for processing a bitstream according to an embodiment of the present application. The apparatus may be integrated in a terminal device. As shown in FIG. 4, the apparatus includes a first acquisition module 31, a second acquisition module 32 and a decoding module 33.

The first acquisition module 31 is configured to acquire an encoded bitstream, where the encoded bitstream includes encoding indication information, where the encoding indication information is used for indicating a bitstream type of the encoded bitstream. The second acquisition module 32 is configured to acquire the encoding indication information. The decoding module 33 is configured to decode the encoded bitstream according to the encoding indication information.

The apparatus for processing a bitstream according to this embodiment is used for performing the method for processing a bitstream of the embodiment shown in FIG. 1. The apparatus for processing a bitstream according to this embodiment has similar implementation principles and technical effects to the method for processing a bitstream of the embodiment shown in FIG. 1. Details are not repeated here.

Based on the preceding embodiment, variant embodiments of the preceding embodiment are provided. For the brevity of description, only differences from the preceding embodiment are described in the variant embodiments.

In an embodiment, the encoding indication information includes an SEI message, and bitstreams corresponding to the bitstream type include a multilayer encoding bitstream and a termination bitstream, where the termination bitstream is a bitstream whose termination encoding is a multilayer encoding bitstream.

In an embodiment, the SEI message includes at least one of: an extended user data SEI message, an extended user data unregistered SEI message, or a newly added SEI message.

In an embodiment, the SEI message includes at least one of: an enhancement type parameter, sub-bitstream parameter information, keyframe identifier information, cancellation identifier indication information, or persistence identifier information, where the enhancement type parameter is configured for indicating an enhancement type of an enhancement layer sub-bitstream included in the encoded bitstream, the sub-bitstream parameter information is used for determining a sub-bitstream that requires to be extracted from the encoded bitstream, the keyframe identifier information is configured for indicating whether the encoded bitstream is a multilayer encoding bitstream, the cancellation identifier indication information is configured for indicating whether a persistence limit of the previous SEI message is canceled by a corresponding SEI message, and the persistence identifier information is configured for indicating whether a persistence limit is set.

In an embodiment, the sub-bitstream parameter information includes at least one of: an enhancement layer number parameter, a quality level, or a layer identifier of a sub-bitstream corresponding to the quality level, where the number of sub-bitstreams corresponding to the quality level is greater than or equal to one, the enhancement layer number parameter is configured for indicating the number of enhancement layer sub-bitstreams included in the encoded bitstream, and the quality level is configured for indicating a quality level that may be provided by the sub-bitstream in the encoded bitstream.

In an embodiment, the decoding module 33 is configured to acquire a sub-bitstream from the encoded bitstream according to the encoding indication information and decode the sub-bitstream.

In an embodiment, that the decoding module 33 acquires the sub-bitstream from the encoded bitstream according to the encoding indication information includes the following.

An enhancement type parameter included in the encoding indication information is acquired. sub-bitstream parameter information corresponding to the enhancement type parameter is acquired. A layer identifier of a sub-bitstream that requires to be extracted is determined according to the sub-bitstream parameter information and a required quality level. The sub-bitstream is extracted from the encoded bitstream according to the layer identifier of the sub-bitstream.

Figure 5:
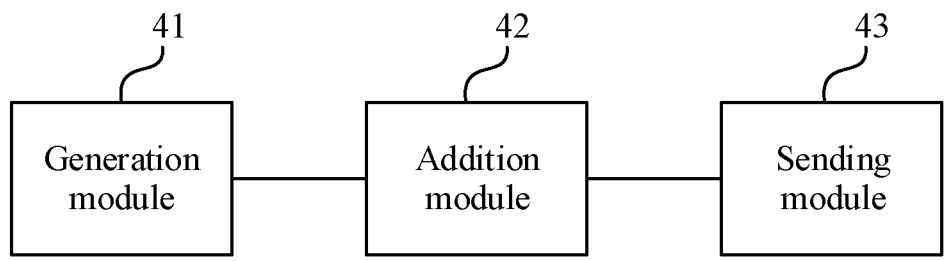
FIG. 5 is a diagram illustrating the structure of an apparatus for processing a bitstream according to an embodiment of the present application.

In an exemplary embodiment, the present application provides another apparatus for processing a bitstream. FIG. 5 is a diagram illustrating the structure of an apparatus for processing a bitstream according to an embodiment of the present application. The apparatus is integrated in a terminal device. As shown in FIG. 5, the apparatus includes a generation module 41, an addition module 42 and a sending module 43.

The generation module 41 is configured to generate an image encoding bitstream and encoding indication information corresponding to the image encoding bitstream. The addition module 42 is configured to add the encoding indication information to the image encoding bitstream to obtain an encoded bitstream. The sending module 43 is configured to send the encoded bitstream.

The apparatus for processing a bitstream according to this embodiment is used for performing the method for processing a bitstream of the embodiment shown in FIG. 3. The apparatus for processing a bitstream according to this embodiment has similar implementation principles and technical effects to the method for processing a bitstream of the embodiment shown in FIG. 3. Details are not repeated here.

Based on the preceding embodiment, variant embodiments of the preceding embodiment are provided. For the brevity of description, only differences from the preceding embodiment are described in the variant embodiments.

In an embodiment, in the case where the image encoding bitstream is a multilayer encoding bitstream, the encoding indication information includes at least one of: an enhancement type parameter, sub-bitstream parameter information, keyframe identifier information, cancellation identifier indication information, or persistence identifier information.

In an embodiment, in the case where the image encoding bitstream is within the persistent scope of the previous encoding indication information, and image end encoding corresponding to the image encoding bitstream is a multilayer encoding bitstream, the encoding indication information includes the cancellation identifier indication information, and the image encoding bitstream is a multilayer encoding bitstream or a termination bitstream.

In an embodiment, the encoding indication information is used for generating a multilayer encoding bitstream, or the encoding indication information is acquired after a multilayer encoding bitstream is generated.

Figure 6:
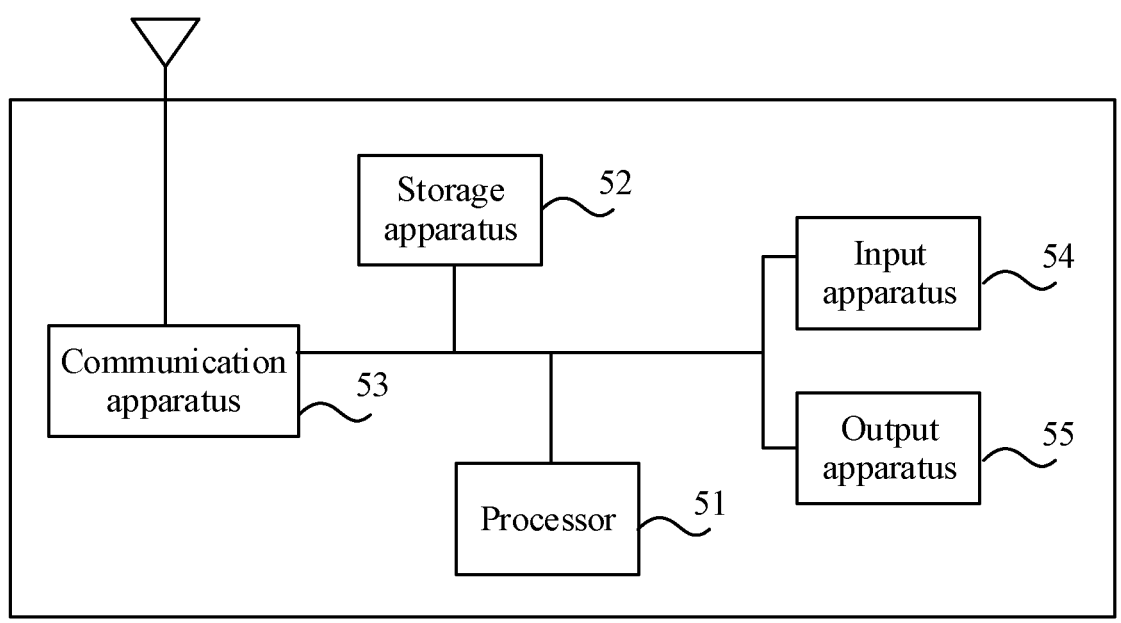
FIG. 6 is a diagram illustrating the structure of a terminal device according to an embodiment of the present application.

In an exemplary embodiment, an embodiment of the present application provides a terminal device. FIG. 6 is a diagram illustrating the structure of a terminal device according to an embodiment of the present application. As shown in FIG. 6, the terminal device according to the present application includes one or more processors 51 and a storage apparatus 52. One or more processors 51 are provided in the terminal device. In FIG. 6, one processor 51 is used as an example. The storage apparatus 52 is configured to store one or more programs. When executed by the one or more processors 51, the one or more programs cause the one or more processors 51 to perform the methods for processing a bitstream in the embodiments of the present application.

The terminal device further includes a communication apparatus 53, an input apparatus 54 and an output apparatus 55.

The one or more processors 51, the storage apparatus 52, the communication apparatus 53, the input apparatus 54 and the output apparatus 55 in the terminal device may be connected through a bus or in other manners. In FIG. 6, the connection through the bus is used as an example.

The input apparatus 54 may be used for receiving inputted digital or character information and for generating key signal input related to user settings and function control of the terminal device. The output apparatus 55 may include a display device such as a display screen.

The communication apparatus 53 may include a receiver and a sender. The communication apparatus 53 is configured to perform information transceiving communication under the control of the processor 51. Information includes, but is not limited to, the encoded bitstream.

As a computer-readable storage medium, the storage apparatus 52 may be configured to store software programs, computer-executable programs, and modules such as program instructions/modules (such as the first acquisition module 31, the second acquisition module 32 and the decoding module 33 in the apparatus for processing a bitstream, and the generation module 41, the addition module 42 and the sending module 43 in the apparatus for processing a bitstream) corresponding to the methods for processing a bitstream described in the embodiments of the present application. The storage apparatus 52 may include a program storage region and a data storage region. The program storage region may store an operating system, and an application program required by at least one function. The data storage region may store data created depending on use of the terminal device. In addition, the storage apparatus 52 may include a high-speed random-access memory and may further include a nonvolatile memory such as at least one disk memory, a flash memory, or another nonvolatile solid-state memory. In some examples, the storage apparatus 52 may include memories that are remotely disposed with respect to the processor 51. These remote memories may be connected to the terminal device via a network. Examples of the preceding network include, but are not limited to, the Internet, an intranet, a local area network, a mobile communication network and a combination thereof.

An embodiment of the present application further provides a storage medium storing a computer program which, when executed by a processor, causes the processor to perform any of the methods according to the present application. The storage medium stores the computer program which, when executed by the processor, causes the processor to perform the method for processing a bitstream according to any of the embodiments of the present application.

The method for processing a bitstream includes the following.

An encoded bitstream is acquired, where the encoded bitstream includes encoding indication information, where the encoding indication information is used for indicating a bitstream type of the encoded bitstream. The encoding indication information is acquired. The encoded bitstream is decoded according to the encoding indication information.

Alternatively, the method for processing a bitstream includes the following.

An image encoding bitstream and encoding indication information corresponding to the image encoding bitstream are generated. The encoding indication information is added to the image encoding bitstream to obtain an encoded bitstream. The encoded bitstream is sent.

A computer storage medium in an embodiment of the present application may adopt any combination of one or more computer-readable media. The computer-readable media may be computer-readable signal media or computer-readable storage media. For example, a computer-readable storage medium may be, but is not limited to, an electrical, magnetic, optical, electromagnetic, infrared, or semiconductor system, apparatus, or device, or any combination thereof. Examples of the computer-readable storage medium include (a non-exhaustive list): an electrical connection having one or more wires, a portable computer disk, a hard disk, a random access memory (RAM), a read-only memory (ROM), an erasable programmable read-only memory (EPROM), a flash memory, an optical fiber, a portable compact disk read-only memory (CD-ROM), an optical memory device, a magnetic memory device, or any appropriate combination thereof. The computer-readable storage medium may be any tangible medium including or storing a program. The program may be used by or used in conjunction with an instruction execution system, apparatus, or device.

A computer-readable signal medium may include a data signal propagated in a baseband or as part of a carrier. The data signal carries computer-readable program codes. The data signal propagated in this manner may be in multiple forms including, but not limited to, an electromagnetic signal, an optical signal, or any suitable combination thereof. The computer-readable signal medium may also be any computer-readable medium other than the computer-readable storage medium. The computer-readable medium may send, propagate, or transmit a program used by or used in conjunction with an instruction execution system, apparatus, or device.

Program codes included on the computer-readable medium may be transmitted by any suitable medium including, but not limited to, a wireless medium, a wire, an optical cable, a radio frequency (RF), or any suitable combination thereof.

Computer program codes for performing the operations of the present application may be written in one or more programming languages or a combination thereof. The one or more programming languages include object-oriented programming languages such as Java, Smalltalk, C++, as well as conventional procedural programming languages such as "C" or similar programming languages. The program codes may be executed entirely on a user computer, executed partly on a user computer, executed as a stand-alone software package, executed partly on a user computer and partly on a remote computer, or executed entirely on a remote computer or a server. In the case related to the remote computer, the remote computer may be connected to the user computer via any type of network including a local area network (LAN) or a wide area network (WAN) or may be connected to an external computer (for example, via the Internet through an Internet service provider).

The preceding illustrates example embodiments of the present application.

It is to be understood by those skilled in the art that the term terminal device encompasses any appropriate type of radio user device such as a mobile phone, a portable data processing apparatus, a portable web browser, or a vehicle-mounted mobile station.

Generally, embodiments of the present application may be implemented in hardware or special-purpose circuits, software, logic, or any combination thereof. For example, some aspects may be implemented in hardware while other aspects may be implemented in firmware or software executable by a controller, a microprocessor, or another computing apparatus, though the present application is not limited thereto.

Embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps and logic circuits, modules, and functions. Computer programs may be stored on a memory. The memory may be of any type suitable for a local technical environment and may be implemented using any suitable data storage technology, such as, but not limited to, a read-only memory (ROM), a random-access memory (RAM), and an optical memory apparatus and system (a digital video disc (DVD) or a compact disc (CD)). Computer-readable media may include non-transitory storage media. The data processor may be of any type suitable for a local technical environment such as, but not limited to, a general-purpose computer, a special-purpose computer, a microprocessor, a digital signal processor (DSP), an application-specific integrated circuit (ASIC), a programmable logic device and a processor based on a multi-core processor architecture.

What is claimed is:

1. A method for processing a bitstream, comprising:
   acquiring an encoded bitstream, wherein the encoded bitstream comprises encoding indication information, and the encoding indication information is used for indicating a bitstream type of the encoded bitstream;
   acquiring the encoding indication information; and
   decoding the encoded bitstream according to the encoding indication information;
   wherein the encoding indication information comprises a supplemental enhancement information (SEI) message, and a bitstream corresponding to the bitstream type comprises a multilayer encoding bitstream.

2. The method according to claim 1, wherein the bitstream corresponding to the bitstream type further comprises a termination bitstream, wherein the termination bitstream is a bitstream that terminates a persistent scope indicated by previous encoding indication information, and the termination bitstream comprises a non-multilayer encoding bitstream.

3. The method according to claim 1, wherein the SEI message comprises at least one of:
   an extended user data registered SEI message, an extended user data unregistered SEI message, or a newly added SEI message.

4. The method according to claim 1, wherein the SEI message comprises at least one of:
   an enhancement type parameter, sub-bitstream parameter information, keyframe identifier information, cancellation identifier indication information, or persistence identifier information,
   wherein the enhancement type parameter is configured for indicating an enhancement type of an enhancement layer sub-bitstream comprised in the encoded bitstream, the sub-bitstream parameter information is used for determining a sub-bitstream that requires to be extracted from the encoded bitstream, the keyframe identifier information is configured for indicating whether the encoded bitstream is the multilayer encoding bitstream, the cancellation identifier indication information is configured for indicating whether a persistence limit of a previous SEI message is canceled by a corresponding SEI message, and the persistence identifier information is configured for indicating whether a persistence limit is set.

5. The method according to claim 4, wherein the sub-bitstream parameter information comprises at least one of: an enhancement layer number parameter, a quality level, or a layer identifier of a sub-bitstream corresponding to the quality level, wherein the number of sub-bitstreams corresponding to the quality level is greater than or equal to one;
   wherein the enhancement layer number parameter is configured for indicating a number of enhancement layer sub-bitstreams comprised in the encoded bitstream, and the quality level is configured for indicating a quality level that is able to be provided by the sub-bitstream in the encoded bitstream.

6. The method according to claim 1, wherein the decoding the encoded bitstream according to the encoding indication information comprises:
   acquiring a sub-bitstream from the encoded bitstream according to the encoding indication information; and
   decoding the sub-bitstream.

7. The method according to claim 6, wherein the acquiring the sub-bitstream from the encoded bitstream according to the encoding indication information comprises:
   acquiring an enhancement type parameter comprised in the encoding indication information;
   acquiring sub-bitstream parameter information corresponding to the enhancement type parameter;
   determining a layer identifier of a sub-bitstream that requires to be extracted according to the sub-bitstream parameter information and a required quality level; and
   extracting the sub-bitstream from the encoded bitstream according to the layer identifier of the sub-bitstream.

8. A non-transitory storage medium storing a computer program which, when executed by a processor, causes the processor to perform the method for processing a bitstream according to claim 1.

9. A method for processing a bitstream, comprising:
generating an image encoding bitstream and encoding indication information corresponding to the image encoding bitstream;
adding the encoding indication information to the image encoding bitstream to obtain an encoded bitstream; and
sending the encoded bitstream;
wherein in a case where the image encoding bitstream is within a persistent scope of previous encoding indication information, and image end encoding corresponding to the image encoding bitstream is a multilayer encoding bitstream, the encoding indication information comprises cancellation identifier indication information, and the image encoding bitstream is the multilayer encoding bitstream.

10. The method according to claim 9, wherein
in a case where the image encoding bitstream is the multilayer encoding bitstream, the encoding indication information comprises at least one of: an enhancement type parameter, sub-bitstream parameter information, keyframe identifier information, cancellation identifier indication information, or persistence identifier information.

11. The method according to claim 9, wherein the encoding indication information is used for generating the multilayer encoding bitstream, or the encoding indication information is acquired after the multilayer encoding bitstream is generated.

12. A terminal device, comprising:
at least one processor; and
a storage apparatus configured to store at least one program,
wherein when executed by the at least one processor, the at least one program causes the at least one processor to perform a method for processing a bitstream, wherein the method comprises:
acquiring an encoded bitstream, wherein the encoded bitstream comprises encoding indication information, and the encoding indication information is used for indicating a bitstream type of the encoded bitstream;
acquiring the encoding indication information; and
decoding the encoded bitstream according to the encoding indication information;
wherein the encoding indication information comprises a supplemental enhancement information (SEI) message, and a bitstream corresponding to the bitstream type comprises a multilayer encoding bitstream.

13. The terminal device according to claim 12, wherein the bitstream corresponding to the bitstream type further comprises a termination bitstream, wherein the termination bitstream is a bitstream that terminates a persistent scope indicated by previous encoding indication information, and the termination bitstream comprises a non-multilayer encoding bitstream.

14. The terminal device according to claim 12, wherein the SEI message comprises at least one of:
an extended user data registered SEI message, an extended user data unregistered SEI message, or a newly added SEI message.

15. The terminal device according to claim 12, wherein the SEI message comprises at least one of:
an enhancement type parameter, sub-bitstream parameter information, keyframe identifier information, cancellation identifier indication information, or persistence identifier information,
wherein the enhancement type parameter is configured for indicating an enhancement type of an enhancement layer sub-bitstream comprised in the encoded bitstream, the sub-bitstream parameter information is used for determining a sub-bitstream that requires to be extracted from the encoded bitstream, the keyframe identifier information is configured for indicating whether the encoded bitstream is the multilayer encoding bitstream, the cancellation identifier indication information is configured for indicating whether a persistence limit of a previous SEI message is canceled by a corresponding SEI message, and the persistence identifier information is configured for indicating whether a persistence limit is set.

16. The terminal device according to claim 15, wherein the sub-bitstream parameter information comprises at least one of: an enhancement layer number parameter, a quality level, or a layer identifier of a sub-bitstream corresponding to the quality level, wherein the number of sub-bitstreams corresponding to the quality level is greater than or equal to one;
wherein the enhancement layer number parameter is configured for indicating a number of enhancement layer sub-bitstreams comprised in the encoded bitstream, and the quality level is configured for indicating a quality level that is able to be provided by the sub-bitstream in the encoded bitstream.

17. The terminal device according to claim 12, wherein the decoding the encoded bitstream according to the encoding indication information comprises:
acquiring a sub-bitstream from the encoded bitstream according to the encoding indication information; and
decoding the sub-bitstream.

18. The terminal device according to claim 17, wherein the acquiring the sub-bitstream from the encoded bitstream according to the encoding indication information comprises:
acquiring an enhancement type parameter comprised in the encoding indication information;
acquiring sub-bitstream parameter information corresponding to the enhancement type parameter;
determining a layer identifier of a sub-bitstream that requires to be extracted according to the sub-bitstream parameter information and a required quality level; and
extracting the sub-bitstream from the encoded bitstream according to the layer identifier of the sub-bitstream.

* * * * *